Patented Feb. 26, 1952

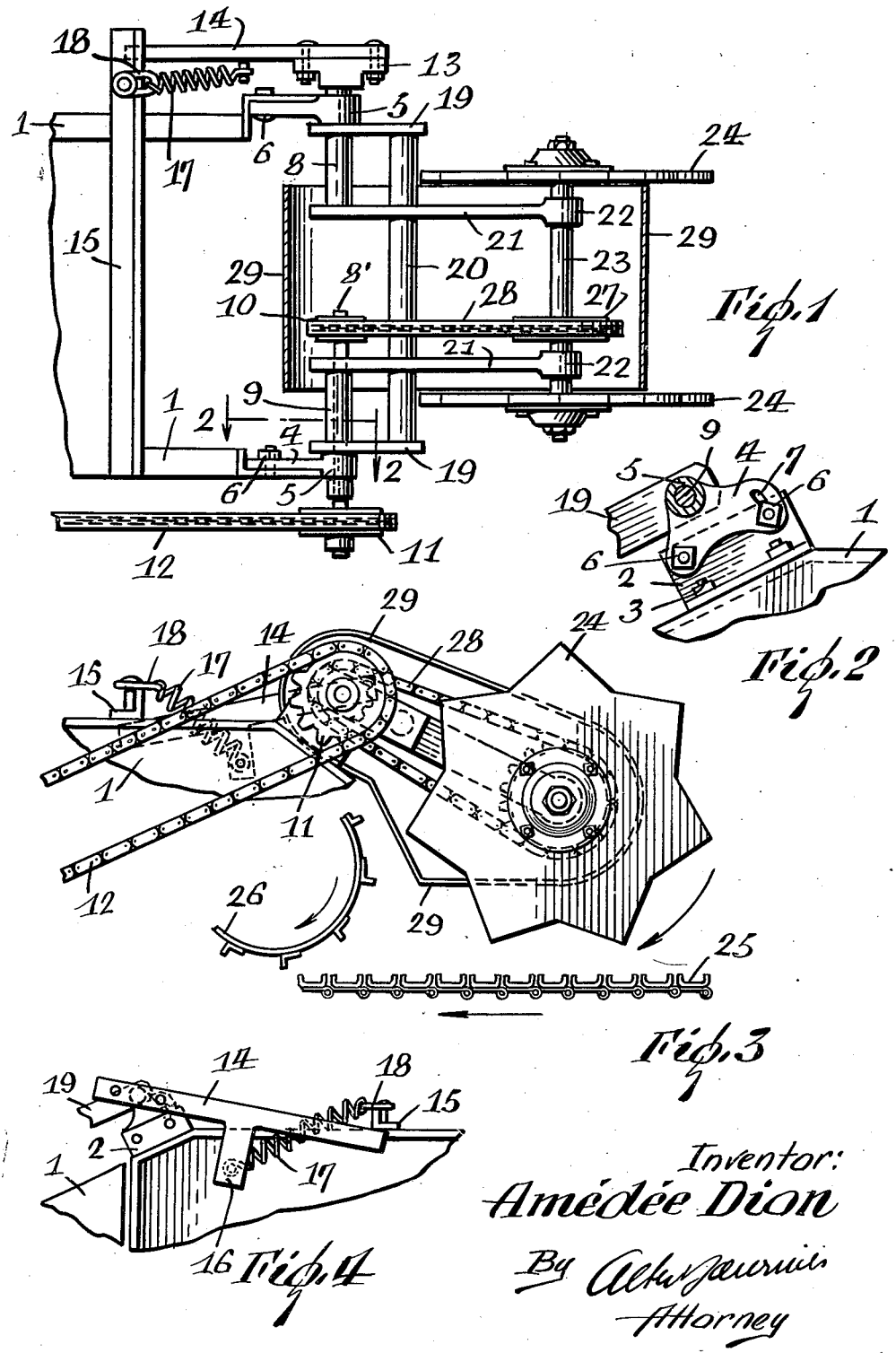

2,587,122

UNITED STATES PATENT OFFICE 2,587,122

FEEDING DEVICE FOR ENSILAGE CUTTERS

Amedee Dion, Ste.-Therese de Blainville, Quebec, Canada, assignor to Dion Freres Inc., Ste.-Therese de Blainville, Quebec, Canada Application September 20, 1948, Serial No. 50,116

4 Claims. (Cl. 198—167)

The present invention pertains to a novel feeding device for ensilage cutters and similar apparatus.

One of the objects of the invention is to enable the use of a chain and sprocket drive for a shaft that carries the notched feeder disks or star wheels. Another object is to provide for automatic adjustment of the elevation of these wheels in response to the thickness or depth of the load on a conveyor beneath the wheels. Still another object of the invention is to provide a resilient means that normally holds the feeder wheels against the load under spring tension.

In the accomplishment of these objects, the fixed frame of the machine carries a pair of alined rotatable shafts carrying laterally extending arms which in turn carry a feeder shaft with the feeder wheels. One of the alined shafts carries a stop arm that is normally pulled upward against the frame by a spring. The spring holds the wheels upon the load and is tensioned as the wheels are forced upward.

The remaining alined shaft is hollow and journals a drive shaft for the feeder shaft. The connection between these shafts is in the form of sprocket wheels and a sprocket chain and permits displacement of the feed shaft about the axis of the drive shaft without disturbing the drive connection.

The invention is fully disclosed by way of example in the following description and in the accompanying drawings in which:

Figure 1 is a plan view of the device;

Figure 2 is a detail section on the line 2—2 of Figure 1;

Figure 3 is a side elevation; and

Figure 4 is a detail side elevation.

Reference to these views will now be made by use of like characters which are employed to designate corresponding parts throughout.

In Figure 1 are shown the side frame bars 1 of an ensilage cutter or similar machine. To an end of each bar is secured a bracket 2 by bolts 3, and to each bracket is fastened a plate 4 having a bearing sleeve 5. The attachment is made by bolts 6 one of which is received in a curved slot 7 in the plate 4 to permit adjustment and alinement of the two bearings 5. Shafts 8 and 8' are mounted in the bearings 5.

On shaft 8' is mounted a sleeve 9 and said shaft 8' carries sprocket wheels 10 and 11 on its ends. The wheel 11 is joined by a chain 12 to the cutter (not shown) for driving the latter. Shaft 8 has a block 13 fixed to its outer end, and to the block is secured an arm 14 extending to a point beneath a cross member 15 of the fixed frame. The arm 14 has a depending lug 16 (Figure 4) joined by a coil spring 17 to a clevis 18 on the member 15. The arm 14 is thus drawn yieldingly upward against the member 15.

Plates 19 extending from shaft 8 and sleeve 9 are joined by a cross piece 20 to insure uniform movement. Bearing arms 21 also extend from the inner ends of shaft 8 and sleeve 9 and are formed at their outer ends with bearing 22 which support a shaft 23. The shaft 23 carries a pair of star wheels 24 that lie over a conveyor chain 25 that feeds ensilage to the cutter, as shown in Figure 3. A rotary drum 26 over the conveyor contributes to the feeding.

The shaft 23 carries a sprocket wheel 27 chained at 28 to the wheel 10 and driven thereby. A guard 29 encloses the chain 28 and adjacent parts.

In the operation of the device, the feeder wheels 24 have a floating support by reason of their ultimate mounting in the sleeves 5. Consequently their elevation is automatically adjustable according to the thickness of material on the chain 25. The lowest elevation is determined by the engagement of the arm 14 beneath the transversal 15. The wheels 24 in rising expand the spring 17 and are thereby returned to a lower position as soon as permitted by the thickness of the load on the chain 25. There is no interference with the drive of the shaft 23 and wheels 24 since the shaft 23 moves about the center of its drive shaft 8'.

Although a specific embodiment of the invention has been illustrated and described, it will be understood that various alterations in the details of construction may be made without departing from the scope of the invention as indicated by the appended claims.

What I claim as my invention is:

1. In a feeding device, a fixed frame, a pair of alined bearings carried thereby, shafts in said bearings, bearing arms fixed to said shafts, a feeder shaft journalled in said arms, feeder wheels carried by the last named shaft, a conveyor beneath said wheels, means on one of the first named shafts for driving the feeder shaft, and an arm extending from the other first named shaft and engaging upwardly against a portion of said frame.

2. In a feeding device, a fixed frame, a pair of alined bearings carried thereby, shafts in said bearings, bearing arms fixed to said shaft, a feeder shaft journalled in said arms, feeder wheels carried by the last named shaft, a conveyor beneath said wheels, means on one of the first named shafts for driving the feeder shaft, and an arm extending from the other first named shaft and engaging upwardly against a portion of said frame, and a spring pulling said arm upwardly against said portion.

3. In a feeding device, a fixed frame, a pair of alined bearings carried thereby, shafts in said bearings, bearing arms fixed to said shafts, a feeder shaft journalled in said arms, feeder wheels carried by the last named shaft, a conveyor beneath said wheels, one of said shafts being hollow, a drive shaft journalled in said hollow shaft and connected to said feeder shaft, and an arm extending from the other of said first named shafts and engaging upwardly against a portion of said frame.

4. In a feeding device, a fixed frame, a pair of alined bearings carried thereby, shafts in said bearings, bearing arms fixed to said shafts, a feeder shaft journalled in said arms, feeder wheels carried by the last named shaft, a conveyor beneath said wheels, one of said shafts being hollow, a drive shaft journalled in said hollow shaft and connected to said feeder shaft, and an arm extending from the other of said first named shafts and engaging upwardly against a portion of said frame, and a spring pulling said arm upwardly against said portion.

AMEDEE DION.

REFERENCES CITED

The following references are of record in the file of this patent:

UNITED STATES PATENTS

| Number | Name | Date |
| --- | --- | --- |
| 746,961 | Heine | Dec. 15, 1903 |
| 881,839 | Appel | Mar. 10, 1908 |
| 1,033,901 | Jensen | July 30, 1912 |
| 2,235,918 | Dion | Mar. 25, 1941 |
| 2,301,088 | Stahl | Nov. 3, 1942 |